(12) United States Patent
Ewing et al.

(10) Patent No.: US 10,599,722 B1
(45) Date of Patent: Mar. 24, 2020

(54) SYSTEMS AND METHODS FOR AUTOMATED DOCUMENT COMPARISON

(71) Applicant: FMR LLC, Boston, MA (US)

(72) Inventors: William D. Ewing, Chapel Hill, NC (US); Nathan Martin, Raleigh, NC (US); Megha Mujumdar, Cary, NC (US); Bibek Lal Shrestha, Cary, NC (US); Shubhada Patil, Cary, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/415,844

(22) Filed: May 17, 2019

(51) Int. Cl.
| | |
|---|---|
| *G06F 16/93* | (2019.01) |
| *G06F 16/14* | (2019.01) |
| *G06F 17/22* | (2006.01) |
| *G06K 9/00* | (2006.01) |
| *G06F 3/0484* | (2013.01) |

(52) U.S. Cl.
CPC ............ *G06F 16/93* (2019.01); *G06F 16/148* (2019.01); *G06F 16/156* (2019.01); *G06F 17/2205* (2013.01); *G06F 17/2211* (2013.01); *G06F 17/2247* (2013.01); *G06F 17/2288* (2013.01); *G06K 9/00483* (2013.01); *G06F 3/04847* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 6,278,452 B1 * | 8/2001 | Huberman | G06F 16/168 715/764 |
| 8,196,030 B1 | 6/2012 | Wang et al. | |
| 9,514,103 B2 | 12/2016 | Kletter | |
| 9,710,704 B2 | 7/2017 | Panferov et al. | |
| 9,747,259 B2 | 8/2017 | Kapadia | |
| 2006/0004821 A1 * | 1/2006 | Bhasker | G06F 8/71 |
| 2007/0234399 A1 * | 10/2007 | Yamazaki | G06F 21/10 725/153 |
| 2008/0144055 A1 * | 6/2008 | Sussmeier | G06F 17/2211 358/1.9 |
| 2009/0028392 A1 | 1/2009 | Ramachandrula et al. | |
| 2009/0213410 A1 * | 8/2009 | Inui | H04N 1/00846 358/1.14 |

(Continued)

*Primary Examiner* — Richard L Bowen
(74) *Attorney, Agent, or Firm* — Proskauer Rose LLP

(57) ABSTRACT

A computerized method of comparing documents includes a computing device: receiving a source document via a first automated document feed channel; receiving a target document via a second automated document feed channel; pre-processing the source document using a first comparison data structure operating on the computing device, thereby producing a pre-processed source document having a text array including text from the source document; pre-processing the target document using a second comparison data structure, thereby producing a pre-processed target document having a text array including text from the target document; determining, using a document comparison engine operating on the computing device, a set of differences between the pre-processed source document and the pre-processed target document with respect to a set of pre-specified criteria; and generating, a summary of the set of differences between the pre-processed source document and the pre-processed target document.

23 Claims, 8 Drawing Sheets

(56) References Cited

U.S. PATENT DOCUMENTS

| | | | |
|---|---|---|---|
| 2013/0047072 A1* | 2/2013 | Bailor | G06F 17/2288 715/234 |
| 2014/0365961 A1* | 12/2014 | Lefor | G06Q 10/0631 715/810 |
| 2015/0169995 A1* | 6/2015 | Panferov | G06K 9/00463 382/182 |
| 2016/0055196 A1 | 2/2016 | Collins et al. | |
| 2016/0224548 A1* | 8/2016 | Massand | G06F 16/93 |
| 2019/0057068 A1* | 2/2019 | Diamond | G06F 17/2288 |
| 2019/0087395 A1* | 3/2019 | Priestas | G06N 20/00 |

* cited by examiner

150

| NB_S1ADMIN.MISMATCH_INFO | |
|---|---|
| P * OFFSET | VARCHAR2 (50 BYTE) |
| P * PRODUCT | VARCHAR2 (50 BYTE) |
| P * PAGE_NUMBER | NUMBER (10) |
| P * STATE | VARCHAR2 (50 BYTE) |
| P * PRINT_TYPE | VARCHAR2 (50 BYTE) |
| P * CONTRACT_NUMBER | VARCHAR2 (50 BYTE) |
| TEXT | CLOB |
| FONT_NAME | VARCHAR2 (50 BYTE) |
| FONT_SIZE | NUMBER (10) |
| FONT_TYPE | VARCHAR2 (50 BYTE) |
| SHOULD_IGNORE | VARCHAR2 (10 BYTE) |
| COLOR | VARCHAR2 (50 BYTE) |
| IGNORE_EXPLANATION | VARCHAR2 (4000 BYTE) |
| ⚷ MISMATCH_INFO_PK (OFFSET, PAGE_NUMBER, PRODUCT, STATE, PRINT_TYPE, CONTRACT_NUMBER) | |
| 🔑 MISMATCH_INFO_PK (OFFSET, PAGE_NUMBER, PRODUCT, STATE, PRINT_TYPE, CONTRACT_NUMBER) | |

SYSTEMS AND METHODS FOR AUTOMATED DOCUMENT COMPARISON

TECHNICAL FIELD

This application relates generally to systems and methods, including computer programs, for comparing documents. More specifically, this application relates to improved computer tools for automatically comparing digital documents using multiple document feed channels and automatically generating summaries of differences between documents.

BACKGROUND

Today, enterprise organizations can store extremely large numbers of documents (e.g., well into the millions or billions) on one or more servers. Some documents can include multiple versions, including non-final drafts, final drafts, and/or executed versions. Different versions of a document can also be written in multiple file formats (e.g., a final draft contract can be saved in Microsoft Word format and an executed version of the contract can be saved in Adobe PDF format). Such differences can make it difficult to determine whether one document (e.g., a source document) matches another (e.g., a target document), either exactly or within an acceptable margin of error defined in reference to one or more pre-specified parameters.

One situation in which documents may need to be compared is a mass migration of enterprise systems to new or upgraded platforms. During such a migration, it can be important to ensure that large numbers of transferred documents match across systems. It can also be important to understand the nature and extent of any mismatches, as well as to share information among disparate (e.g. non-co-located) teams so that mismatches can be quickly identified and resolved.

SUMMARY

Accordingly, the invention provides a novel framework, including a computing system and associated computing methods and modules, for automatically comparing documents, which can improve the quality of document generation from automated systems, as well as speed up the approval of changes made to documents which are outputted from those systems.

In one aspect, the invention features a computerized method of comparing documents. The method includes receiving, by a computing device, a source document via a first automated document feed channel in electronic communication with the computing device. The method also includes receiving, by the computing device, a target document via a second automated document feed channel in electronic communication with the computing device. The method also includes pre-processing, by the computing device, the source document using a first comparison data structure operating on the computing device, thereby producing a pre-processed source document having a text array including text from the source document. The method also includes pre-processing, by the computing device, the target document using a second comparison data structure, thereby producing a pre-processed target document having a text array including text from the target document. The method also includes determining, by the computing device, using a document comparison engine operating on the computing device, a set of differences between the pre-processed source document and the pre-processed target document with respect to a set of pre-specified criteria. The method also includes generating, by the computing device, a summary of the set of differences between the pre-processed source document and the pre-processed target document.

In some embodiments, the method includes providing, by the computing device, the summary of the set of differences to one or more user computing devices in electronic communication with the computing device. In some embodiments, providing the summary of the set of differences includes coloring, by the computing device, the differences according to difference type, each difference type corresponding to a distinct color. In some embodiments, providing the summary of the set of differences includes generating, by a graphical user interface operating on the computing device, a balloon graphic illustrating differences of different types distinctly. In some embodiments, the method includes storing, by the computing device, the set of differences between the pre-processed source document and the pre-processed target document in a server file system in electronic communication with the computing device. In some embodiments, generating the summary of the set of differences includes (i) identifying each difference in the set of differences as significant or insignificant based on a threshold specified for each of the pre-specified criteria, and (ii) distinguishing the significant differences from the insignificant differences in the summary.

In some embodiments, the pre-specified criteria and the thresholds are configurable by a user. In some embodiments, the set of pre-specified criteria includes textual content, image content, font name, font size, and font style. In some embodiments, the method includes assigning, to each of the source document and the target document, a tag indicating a document group or hierarchy based on one or more identifying criteria specified by a user. In some embodiments, the method includes prompting a user to mark one or more differences between the source document and the target document as permissible. In some embodiments, each of the first channel and the second channel includes one of a representational state transfer (REST) service, a simple object access protocol (SOAP) service, a system file location, or a server file location. In some embodiments, the method includes counting separately, by the computing device, page numbers for each of the source document and the target document. In some embodiments, at least one of the first channel or the second channel includes a static document channel for isolating a limited set of content exempt from operation of the document comparison engine.

In some embodiments, each difference in the set of differences is bounded by a minimum amount of matching content between the source document and the target document. In some embodiments, pre-processing at least one of the source document or the target document includes performing, by the computing device, optical character recognition on at least a portion of an image included in the source document or the target document. In some embodiments, the summary of the set of differences between the pre-processed source document and the pre-processed target document is included in an HTML file. In some embodiments, the HTML file includes a hyperlink to re-test the target document. In some embodiments, the HTML file includes a hyperlink to at least one of the source document or the target document. In some embodiments, generating the summary of the set of differences includes writing a file summarizing page results and another file summarizing image comparison results. In some embodiments, pre-processing the source document and pre-processing the target document each include generating a separate array including non-textual characters.

In another aspect, the invention features a computing system for comparing a first document and a second document. The computing system includes a computing device having a processor and a memory. The computing system also includes first storage in electronic communication with the computing device via a first automated document feed channel, the first storage for storing at least one source document. The computing system also includes second storage in electronic communication with the computing device via a second automated document feed channel, the second storage for storing at least one target document. The computing device is configured to: receive the source document via the first channel; receive the target document via the second channel; pre-process the source document using a first comparison data structure operating on the computing device, thereby producing a pre-processed source document having a text array including text from the source document; pre-process the target document using a second comparison data structure, thereby producing a pre-processed target document having a text array including text from the target document; determine, using a document comparison engine operating on the computing device, a set of differences between the pre-processed source document and the pre-processed target document with respect to a set of pre-specified criteria; and generate a summary of the set of differences between the pre-processed source document and the pre-processed target document.

In some embodiments, the first storage includes a first cloud server and the second storage includes a second cloud server. In some embodiments, the system includes a user computing device in electronic communication with the computing device for receiving at least one of comparison requests or displaying test results. In some embodiments, the computing device includes a cloud server having a java application server and a server file system.

In some embodiments, the invention provides a computing device that automatically compares large numbers of documents in a document hierarchy. In some embodiments, the invention catalogs textual differences, image differences, and differences in font size, font name, and font style. In some embodiment, the invention uses web pages to show document differences to teams; allows marking of differences in the documents that are acceptably different so that documents can show as matching even if there are mismatches; provides pop-up details of each difference; and/or rolls document differences up the hierarchy so groups of documents can be shown to be the same or different at a glance.

In some embodiments, the invention marks document differences along one or more of the following dimensions: text, font name, font size, font style, and images. In some embodiments, the invention displays a popup for each difference. In some embodiments, the invention groups documents into a hierarchy and/or rolls the document matches or differences up the hierarchy so that entire groups of documents can be seen to match at a glance. In some embodiments, the invention allows marking of differences in the documents as "okay," meaning that even though a pair of documents do not match, they will be shown as matching by the system all the way up the hierarchy. In some embodiments, the invention provides the ability to share the differences in real time between disparate teams.

In some embodiments, the invention includes "fuzzy logic" comparison of the various meta data pieces in a pair of document files. In some embodiments, the invention includes using a balloon-style visualization of the differences in metadata between documents, e.g., including font name, font type, and/or font size. In some embodiments, the invention includes marking of individual differences in a given document as acceptable or unacceptable and/or capturing a reason for accepting the difference. In some embodiments, the invention includes using an acceptable or unacceptable marking inside of each document to cascade a visual color reference up the hierarchy of the document tree so that a set of documents can be easily identified as having passed the difference testing or not. In some embodiments, the invention includes a "page skipping" feature in which, in a particular document pair, one of the documents may have an extra page somewhere in the document (and since it is a known difference, it should be ignored in the comparison). In some embodiments, the invention provides a document comparison system that inputs documents under test in an automated fashion from multiple feed sources or channels (e.g., ftp, sftp, rest, soap, etc.) by simply selecting the channel type in a drop-down menu. In some embodiments, the invention includes hierarchy levels defined by an end user in a data structure front ended by a maintenance page. In some embodiments, this allows flexible hierarchy definition and management in any business environment.

BRIEF DESCRIPTION OF THE DRAWINGS

The advantages of the invention described above, together with further advantages, may be better understood by referring to the following description taken in conjunction with the accompanying drawings. The drawings are not necessarily to scale; emphasis is instead generally placed upon illustrating the principles of the invention.

FIG. 1B shows a sample database structure included in the computing system for automatic document comparison, according to an illustrative embodiment of the invention.

FIG. 1C shows a sample data structure used to determine page alignments and page skips included in the computing system for automatic document comparison, according to an illustrative embodiment of the invention.

FIGS. 3A-3D are screenshots of webpages generated to compare documents, according to an illustrative embodiment of the invention.

DETAILED DESCRIPTION

Figure 1A:
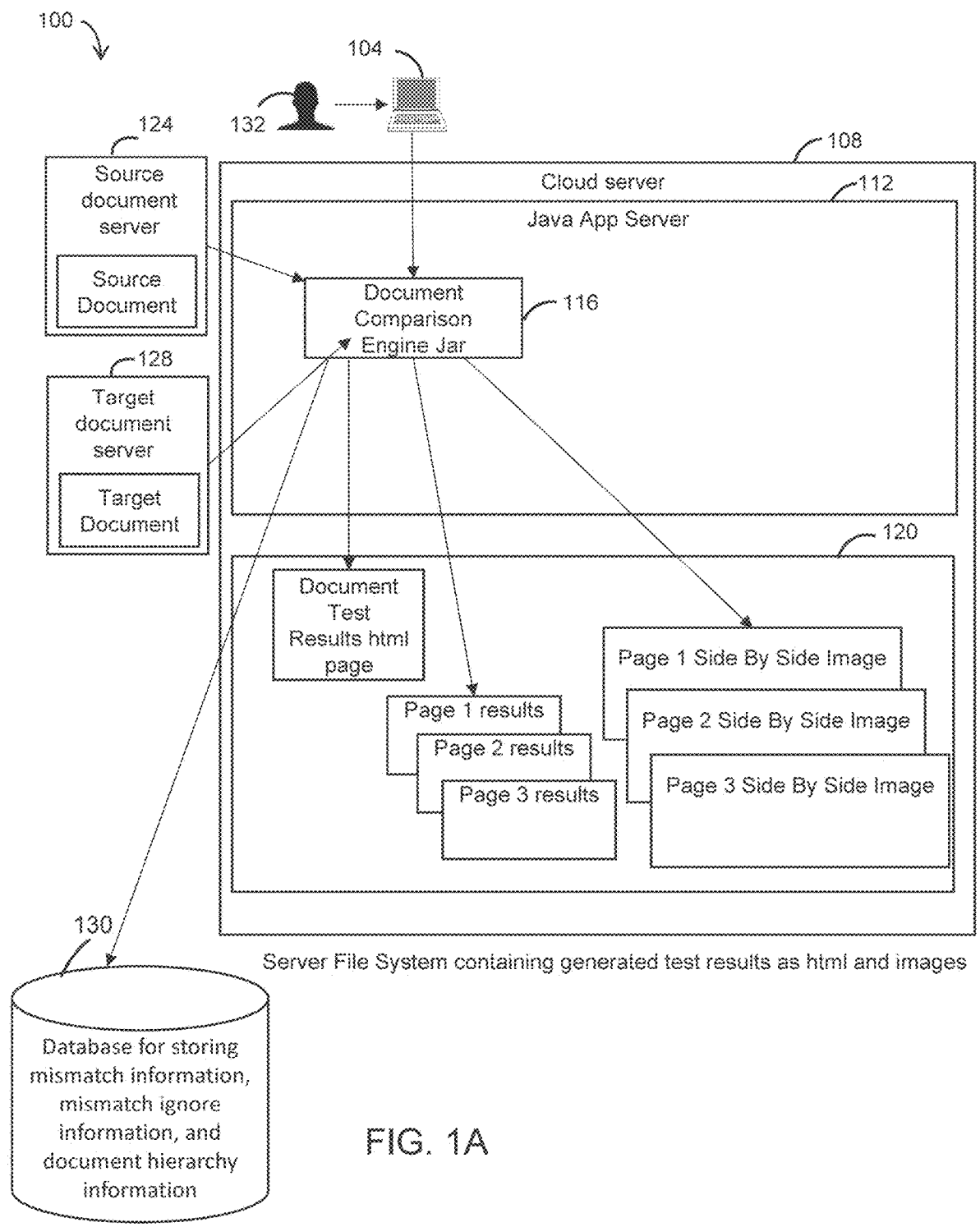
FIG. 1A is a schematic diagram of a computing system for automatic document comparison, according to an illustrative embodiment of the invention.

FIG. 1A is a schematic diagram of a computing system 100 for automatic document comparison, according to an illustrative embodiment of the invention. The computing system 100 includes a user computing device 104 and a server computing device 108 in electronic communication with the user computing device 104. The server computing device 108 includes an application server 112 having a document comparison engine 116 and a server file system 120 in electronic communication with the application server 112. The server computing device 108 is in electronic communication with a source document server 124 storing one or more source documents and a target document server 128 storing one or more target documents. The computing system 100 also includes a database 130 in electronic communication with the server computing device 108, which can be used for storing certain needed information, e.g., mismatch information, mismatch ignore information, and document hierarchy information.

During operation, a user 132 clicks on a test page via the user computing device 104 to start a document test. The user computing device 104 then issues a call (e.g., a REST call from a start page) to the document comparison engine 116 of the application server 112 to start testing. The document comparison engine 116 then retrieves a source document from the source document server 124 and a target document from the target document server 128. The document comparison engine 116 then compares the source document with the target document. The document comparison engine 116 then writes to the server file system 120 (i) document test results, (ii) page results, and (iii) side-by-side image results. The document comparison engine 116 then sends to the user computing device 104 the document test results, page results and side-by-side image results so that the user 132 can see these results on the user computing device 104.

In one exemplary embodiment, the system 100 uses the following algorithm to match a single document pair. First, document hierarchy information stored in the database 130 is written in a comparison data structure (also stored in the database 130), which can improve system performance during the matching process. Second, any mismatched records which do not have an "ignore" flag set to "yes" are deleted from the database 130. This flag is used to track mismatches which the user(s) deem as okay. If all mismatches for a given document pair are deemed as okay (meaning all mismatches have the ignore flag set to "yes"), then that document is deemed overall as okay, and the document group test page will give a visual indication that the document pair matches. If all documents in the document group match, then all other pages up the document hierarchy will give a visual indication that all documents in the document group match. Third, page skip data can be stored in the comparison data structure for better performance during the matching process, as well as to skip pages which may have been added, e.g., in the target document in the document pair, and therefore do not have to match a page in the source document of the pair. Fourth, source and target documents can be retrieved from their respective document servers (e.g., source document server 124 and target document server 128) and can be stored on the server file system 120, with their filenames inputted into the comparison data structure in the database 130. FIG. 1B shows a sample database structure 150 that may be used. The database structure 150 can exist as both a database table for persistent storage, as well as an in-memory data structure for processing performance.

Fifth, static comparison content can be retrieved from the server file system 120, and the artifact can be saved to the server file system 120. The artifact file names, their page numbers, and an indication of whether the artifact represents source or target document content can be inputted into the comparison data structure. Sixth, steps can be taken to ensure that both source and target documents, as well as any static content, are in their proper places, and if not, generate an error message for display to the user 132 and skip the test. Test documents and other static documents can be placed into the server file system 120, e.g., by an upload page or by placing them into a source control or other versioning system. If they are placed into a source control system, when there is new content to be compared, a simple deployment process using an automated deployment mechanism (e.g., a standard server build and deploy tool) could place the documents and artifacts under test onto the server file system 120. Seventh, handles can be opened to source, target and static documents. These handles can be in the form of file names, and paths (e.g., uri's), and the handles can be stored in the comparison data structure for better performance during the matching process. Eighth, the number of pages of both source and target documents can be determined, and the higher number can be used as the maximum value for the page counter in the comparison data structure.

Figure 1C:
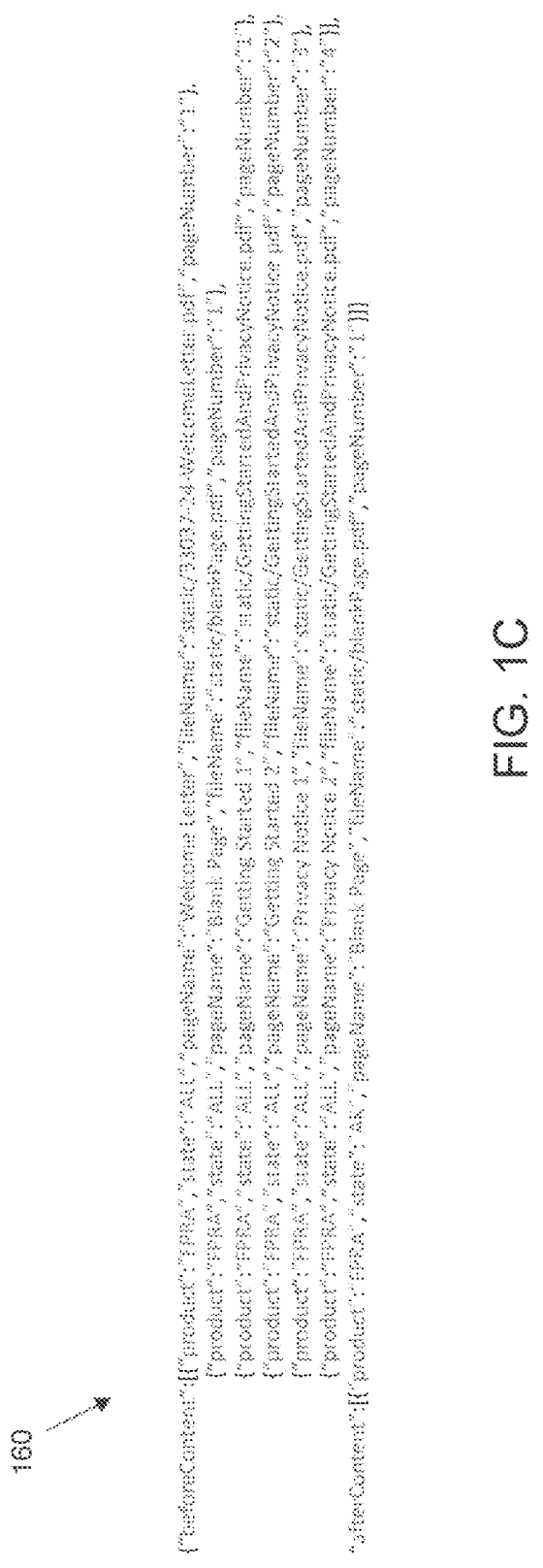

Ninth, a page loop counter can be started at page 1. Tenth, the comparison data structure can be checked to determine whether there is a page skipped in either the source or the target document. If there is, the page loop counter can be incremented for that document to skip the pages. The data structure in FIG. 1C can be used to determine page alignments and page skips. One of these records can exist for each document group, so that the comparison tool knows how to compare the various pages. If there is not, no further action needs to be taken for this step. Eleventh, the comparison data structure can be checked to determine whether the static content should be used for the comparison of a certain page, e.g., whether the comparison should be made between the source document and the static document or the target document and the static document, or whether the comparison should be made between the source and target documents. Twelfth, text from the page of the two pages being matched should be stripped and stored as a text array in the comparison data structure.

Thirteenth, the text comparison is started. This process can proceed according to the following sub-steps:

a. First, check to see if the source page array is empty. If it is, report that the mismatch is that all text on the page exists in the target page but not on the source page.

b. Next, check to see if the target page array is empty. If it is, report that the mismatch is that all text on the page exists in the source page, but not in the target page.

c. Start the text comparison loop from item zero in the text arrays of both pages to be compared.

d. If the end of the array of either document is reached at this point, then there are no mismatches and no text to compare. In this case, exit the loop.

e. Set the maximum value for the page loop counter to the larger of the two arrays.

f. For each item in the array, check to see if it is a printable character. (In some cases, it is found that non-printable characters sometimes do not match exactly, even if the mismatch cannot be seen in the document. So, in some embodiments, mismatches between non-printable characters are not reported as a mismatch.)

g. If there is a non-printable character in both arrays, then advance the page loop until the next printable character is found. Based on what kind of non-printable character it is, optionally output it to the output html page using html encoding. For example, in the case of a carriage return, "<BR>" can be outputted to the html page; or in the case of a space, " " can be outputted. Using these escape sequences, the output html page can provide a good relative representation of the page under test.

h. A separate array index can be kept for each of the two arrays, because one array may contain more non-printable characters than the other, and the two indexes can be different at any given time.

i. If there is a printable character, then first see if the characters between the two arrays match.

If the two characters do match, start the font check:

i. If the Font Name is found to be a mismatch based on a "Font Normalization" mapping algorithm (e.g., as described herein), then look ahead in the source and target arrays for the next matching font. Then:

1. Output any mismatching character(s) to the output html page with a pre-specified indication scheme (e.g., a color of blue and a background color of red).
2. Write a pop-up message describing the font name of the target document at this location and the font name of the source document at this location.
3. Send the mis-match data to the database 130 so the mismatches can be tracked.

ii. If the Font Type is found to be a mismatch based on the "Font Normalization" mapping mentioned above (e.g., Bold vs Italic), then look ahead in the source and target arrays for the next matching font. Then:
1. Output any mismatching character(s) to the output html page with a different pre-specified indication scheme (e.g., a color of green and a background color of red).
2. Write a pop-up message describing the font type of the target document at this location and the font type of the source document at this location.
3. Send the mis-match data to the database 130 so the mismatches can be tracked.

iii. If the Font Size is found to be a mismatch based on the "Font Normalization" mentioned above, then look ahead in the source and target arrays for the next matching font. Then:
1. Output any mismatching character(s) to the output html page with a different pre-specified indication scheme (e.g., a color of aqua and a background color of red).
2. Write a pop-up message describing font size of the target document at this location and the font size of the source document at this location.
3. Send the mis-match data to the database 130 so the mismatches can be tracked.

iv. If the text is a match, and all the fonts are also a match, then write the character to the output html page as a black letter with a white background.

j. If the character is found not to match, then start the mismatch loop.
i. The mismatch loop runs multiple "feelers" out ahead to find the next place where the buffer starts matching again.
ii. In the source page array, perform a "look ahead" operation until a printable match is found again. The look ahead can be performed by searching in the text array for each document in the document pair. This next match can be found according to the Match Definition (e.g., defined as the configurable number of matching characters required before the next match is deemed to be found by the system).
iii. Next, perform the same "look ahead" operation in the target document.
iv. Next, compare the number of characters between the index of the first mismatch and the index of the next match. Use the smaller number to determine where the mismatch ends (e.g., to determine whether the text is missing in the source document or in the target document). Whichever document has the shorter distance to the next match will be determined to be the document where the text exists (as opposed to is missing).
v. With a mismatch identified, along with a determination of whether text is missing in the target document or the source document, a mismatch output indication can be written. If text is missing in the source document, but exists in the target document, then the mismatch can be written using a specified indication scheme, e.g., as having black text with a green background on the output html page. If, however, the text is missing in the target document but exists in the source document, the mismatch can be written using a different specified indication scheme, e.g., as having yellow text on a red background on the output html page. After coloring the text, a pop-up message can be set to show whether the text is missing in the source document or the target document.
vi. The mis-match data can be sent to the database 130 so we can track the mismatches.

Fourteenth, after matching text on the document, match the images, e.g., using this process:
a. First strip any images found in the source and/or target documents out of the documents.
b. Start the "image matching loop," e.g., as described herein.
i. For each image, perform a binary match between an image found in the source document and a corresponding image found in the target document. An assumption here is that the images in each of the source and target documents will be in the same order when stripped. This is normally a safe assumption, as usually documents that are at least relatively close in content are chosen to be matched.
ii. The binary match uses a configurable Image Difference to determine whether or not the images are actually "close enough" to be considered a match, even if they are not an exact match. Binary matching can be done by performing a byte-by-byte comparison on the two images and then allowing for a configurable number of mismatching bytes. If few enough mismatching bytes are found according to user configuration settings, then the image is deemed as matching; otherwise it is a mismatched image.
iii. If the images match, then output the image to the output html page in its original form.
iv. If the images are a mismatch, attempt to perform an optical character recognition (OCR) the images.
v. If the OCR returns text from both images, then perform a textual match on the text, e.g., as described above with respect to the text matching loop.
vi. If the OCR return no text from one or both images, output both images to the output html page, and configure the source page image with a pre-specified indication (e.g., a red tint) and configure the target page image with a different pre-specified indication (e.g., a green tint).

Fifteenth, after matching text and images between the documents, write the test results as an HTML output page, e.g., using this process:
a. The test results output page rolls up all test results for all the documents at the bottom of a particular point in the document hierarchy. For example, for a document hierarchy with three levels—Document Type, Product, and State—a test results page can be created for each State.
b. The test results page includes at the top a title that includes all levels in the document hierarchy to permit easy visualization of the part of the document hierarchy being viewed.
c. The top of the test results page also includes a page refresh link, a test-all link, and bread crumbs links to walk back up the document hierarchy. The page refresh link allows the user to refresh the page manually—it can be included so that if the user has stepped away during active testing and wants a fresh copy of the results, such a copy can be easily obtained. The test-all link performs testing on all documents on the test results page (e.g., in the above example, all documents for the particular State, Product, and Document Type).
d. The test results output page also lists the document pairs under test. Each document pair can include a header describing the document, which can be colored according to the testing status of the document. Documents that have passed their comparison test can have a header marked with one pre-specified indication (e.g., text colored green); documents that have failed can have a header marked with another pre-specified indication (e.g., text colored red); and documents that have errors that users have deemed as not requiring fixes can have a header marked with a third pre-specified indication (e.g., text colored yellow).
e. In addition to the header text, the header can also contain three links: a re-test link; a "view source document" link; and a "view target document" link. The re-test link can be configured to re-run the test on that particular document, e.g., as described above. The view source document link can be configured to show the source document under test in a new tab in the user's browser. The view target document link can be configured to show the target document under test in a new tab in the user's browser.
f. If a document has failed its test, or if it has errors that do not need to be fixed, then a link to each html output page that includes errors can be displayed directly below the header text, and a link to a side-by-side comparison image can also be displayed for each error page.

In some embodiments, the invention uses a test hierarchy, which includes automated testing of large numbers of documents and requires that the documents be categorized for ease of testing and for the ease of interpreting the results. Documents can be categorized, for example, by Company, Division, Document Type, Product, Country, State, and/or Print Type. Groupings that use words such as ALL and GENERIC are also allowed. For example, "ALL" can be used where for a given Company, a user desires to test a given Document Type in "ALL" Divisions. Similarly, "GENERIC" can be used where, if a user has a list of states (e.g., say Oklahoma, Virginia, and North Carolina) that all have the same document output, the user can put them into a state category of "GENERIC" and test all of those states' documents at once. In some embodiments, there is a web page for each level in the document hierarchy to allow navigation down the hierarchy to the individual test results pages.

In some embodiments, the invention uses a "page-by-page comparison" and/or a "page skipping" feature. One problem that is commonly encountered when comparing two documents is that the page numbers do not match between the two documents, creating the issue that the two whole documents cannot simply be compared straightforwardly. A page-by-page testing procedure using a configuration called "page skipping" can be used as a workaround. Each page skip can be defined on either the source document or the target document. Separate page counters can be kept for the source document and target document so that if, for example, page 1 in the source document is skipped because it is blank, then page 2 of the source document would be compared to page 1 of the target document, and then page 3 of the source document against page 2 of the target document, and so on.

The invention makes use of source and target document channels. These channels can provide a universal way to feed the source documents and target documents into the document comparison system. For either a source document or a target document, before comparing, the comparison tool pulls the latest version of the documents from its respective document feed channel. Each channel can be a REST service, a SOAP service, a place on the file system, or a place on an FTP or SFTP server.

As mentioned above, the invention also can make use of a static content document channel. Sometimes documents include static pages (e.g., a welcome letter appears in either the source or target document, but not in the other). A user may still want to compare these documents to each other. In order to accommodate this comparison case, a static content document channel is introduced—e.g., a place where the system can access static content, and a user can define which page and which document the static content represents. Then, during the comparison of that page, the static content can be used in the process of the comparison. In some embodiments, the invention provides the ability to compare source and target documents of different file types. For example, each document can be a Word document, a PDF file, a text document, or an image.

The invention provides the ability to "normalize" font name, font type, and/or font size. In order to reliably compare fonts in a document pair, it is beneficial to have a configurable normalization of those fonts. The reason is that, whether it is font name, font type, or font size, the output of the text in the document can match exactly, but the font values in the document can be somewhat different. For font size, there is typically no visible difference between a 12-point font and a 12.001-point font. Under the concept of font size normalization, an acceptable range of difference between two font sizes can be defined. If, for example the system sees a font size of 12 points for some text on the source document, but it sees a font size of 12.25 points on the target document, the system can be configured such that a difference within a small margin of acceptable difference (here, perhaps 0.5 points) will be deemed as matching by the system. For font name, there are many font names for any given font family, and the concept of a configurable mapping of names between the documents can be so that, for example, if text on the source file has a font name of Courier, and the matching text on the target document has a font name of Courier New, then the two can be configured to map as a match. This font name normalization allows matching of fonts that are acceptable even though they are not an exact match. Finally, for Font Type, the same mapping concept as for font name can be used. For example, the document comparison system might see text on the source document with a font type of Heavy, but on the target document it may be simply Bold text. A configurable mapping between these two types can be allowed so that they will be considered a match, even though there are small differences between them.

The invention can also use a configurable match definition. This feature is prompted by another issue encountered when matching text in a pair of documents, which is that if a mismatch is found in the text, the task then becomes to search for the next match, e.g., so the algorithm can be reset. The challenge becomes: how many characters should be used as the basis to determine that the algorithm is back to finding matching text. To make this flexible enough to handle several different types of documents, a configurable match definition is introduced. As an example, consider two short documents—one saying "I am the source document" and the other saying "I am the target document". If matching occurs beginning with the letter "I", then a match is determined until the word "target" is reached (i.e., it is different from the word "source"). At that point, how is it determined that matching text has started again? If only the next letter were considered, a space would be found in both. However, that would probably not be sufficient in most cases. So, a configuration item allows the user to define how many matches must be found before the end of the mismatch is deemed to be found. This feature could be used to match several documents to find what works best for those particular documents. So, in the above example, it could be specified that the Match Definition is 3, such that the system would need to a the space plus the next two letters of "do" before it deemed that the previously encountered mismatch is over. It would then mark the output as having a mismatch of "source" vs "target".

In some embodiments, the invention provides text and image comparison with OCR capabilities. For any given document there exists a possibility of encountering a mixture of text and images during comparison. Sometimes an entire page may include nothing but an image, and sometimes that image will contain all the text on the page. To handle this possibility, the system can first attempt to find all text on the page and compare that text between the source and target document. Next, it can look for any images on the page. If those images match in a binary, byte-for-byte manner, then they are also considered a match. But, if those images do not match, then text can be read from the image using OCR, and then the text from the image can be compared. In addition, while matching the image binary, a feature can be introduced to configure an acceptable image difference by percentage of bytes. For example, if only 2% of the pixels do not match, the tool can be configured to allow a 2% mismatch, such that those images will be deemed a match by the tool.

In some embodiments, the invention can ignore errors deemed to be acceptable. Another issue with regression testing of large numbers of documents is that inevitably a situation will occur in which some mismatches do not need to be fixed. In such a case, the test should still be passed, but the user may want to know which errors are actually there but are acceptable. To address this situation, the concept of acceptable errors can be introduced. After the tool has outputted its mismatch information, each mismatch can be visible as highlighted text, or a colored image, which is colored according to the mismatch type. The tool can allow clicking of a given mismatch to mark it as acceptable, meaning that it does not need to be fixed. When text is clicked, it is colored as black with a yellow background. This information is then carried all the way up the hierarchy and is retained through subsequent tests. Thus, after all errors in a given document pair have been fixed except the ones marked as acceptable, then the document can be colored as yellow to indicate that no unacceptable errors exist in the document.

The invention can output errors as html pages. One feature that is important when performing a document comparison is being able to share results among people who may or may not be co-located quickly and efficiently. For this reason, html can be chosen as the output for the document comparison tool. The test results for a set of documents can all appear on one page, and there can be links on the page to: retest a single document; test all documents on the page; refresh the page; and/or view the source and target documents for each document pair under test.

The invention provides for coloring errors based on error type. This can help a user tell at a glance which error was detected by the tool. For example, text that exists in the source document but not the target document can be colored yellow with a red background. Text that exists in the target document but not the source document can be colored black with a green background. Text for which font names do not match can be colored blue with a red background. Text for which the font sizes do not match can be colored aqua with a red background. Text for which the font types do not match can be colored green with a red background. In addition to the coloring of the mismatched text, the invention can also provide a "balloon help" pop-up for each error. A balloon can pop up when a user places his or her mouse over the mismatch and can provide detailed information about the mismatch.

The invention can also provide retest links for each document pair as well as all documents on the test results page. The test results page includes a link for each document that allows retesting of the document pair in real time. When this link is clicked, the system retrieves the latest source and target documents from their respective document feed channels and runs the comparison engine against them, outputting the results as a series of html pages (e.g., one page per each page of the document pair that is found to have at least one mismatch). In addition to an html page for each page that is found to have at least one mismatch, the system can also provide a .png image file output with a side by side comparison of the two pages for quick viewing of the actual issue(s). After retesting, the test results page can automatically update in real time, and the output pages can also be available right away. There can also be a test-all link, so that all document pairs under test for the given test results page in this part of the test hierarchy can also be run at one time. A link to each document under test can be provided, so that each document can be viewed in its entirety and/or sent to others. For each document on the test results page, there can be a link to display the source document and/or target document in a new browser tab. This feature can allow viewing of the actual documents under test, allowing testers to save the documents or email them to others.

In some embodiments, the invention lets users mark pass, fail, or acceptable document matches with colors all the way up the hierarchy. The header text of each document under test on the test results page can receive a color at the end of testing (e.g., green means there were no mismatches, red means there are errors which need fixing, and yellow means that there are errors, but none of the errors needs fixing). This overall color score can be carried all the way up the testing hierarchy. As an example, a user can have three documents to test for the state of Virginia, and they all page, then the Virginia link on the state page will also be green. If the user has to test the state of Virginia and the state of Pennsylvania for an insurance product, and all the documents in both pass, then on the insurance product page, both the state of Pennsylvania and state of Virginia will be green, and this will be true for all links on all parent pages as well.

Figure 2:
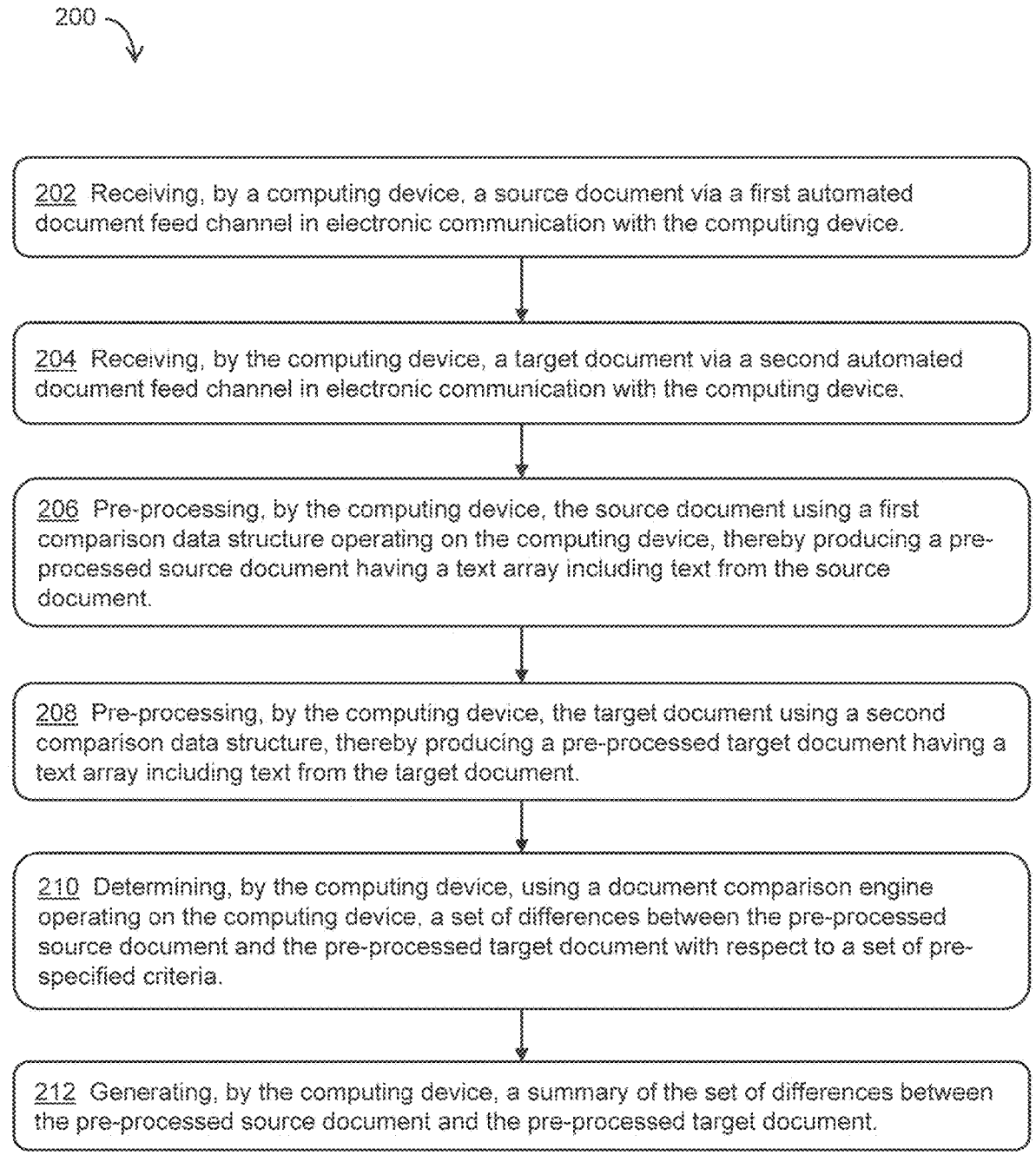
FIG. 2 is a flow diagram of a computerized method for automatically comparing documents, according to an illustrative embodiment of the invention.

FIG. 2 is a flow diagram 200 of a computerized method for automatically comparing documents, according to an illustrative embodiment of the invention. The steps can be performed by the computing system 100 shown and described in FIG. 1A. In a first step 202, a computing device receives a source document via a first automated document feed channel in electronic communication with the computing device. In a second step 204, the computing device receives a target document via a second automated document feed channel in electronic communication with the computing device. In a third step 206, the computing device pre-processes the source document using a first comparison data structure operating on the computing device, thereby producing a pre-processed source document having a text array including text from the source document. In a fourth step 208, the computing device pre-processes the target document using a second comparison data structure, thereby producing a pre-processed target document having a text array including text from the target document. In a fifth step 210, the computing device determines, using a document comparison engine operating on the computing device, a set of differences between the pre-processed source document and the pre-processed target document with respect to a set of pre-specified criteria. In a sixth step 212, the computing device generates a summary of the set of differences between the pre-processed source document and the pre-processed target document.

Figure 3A:
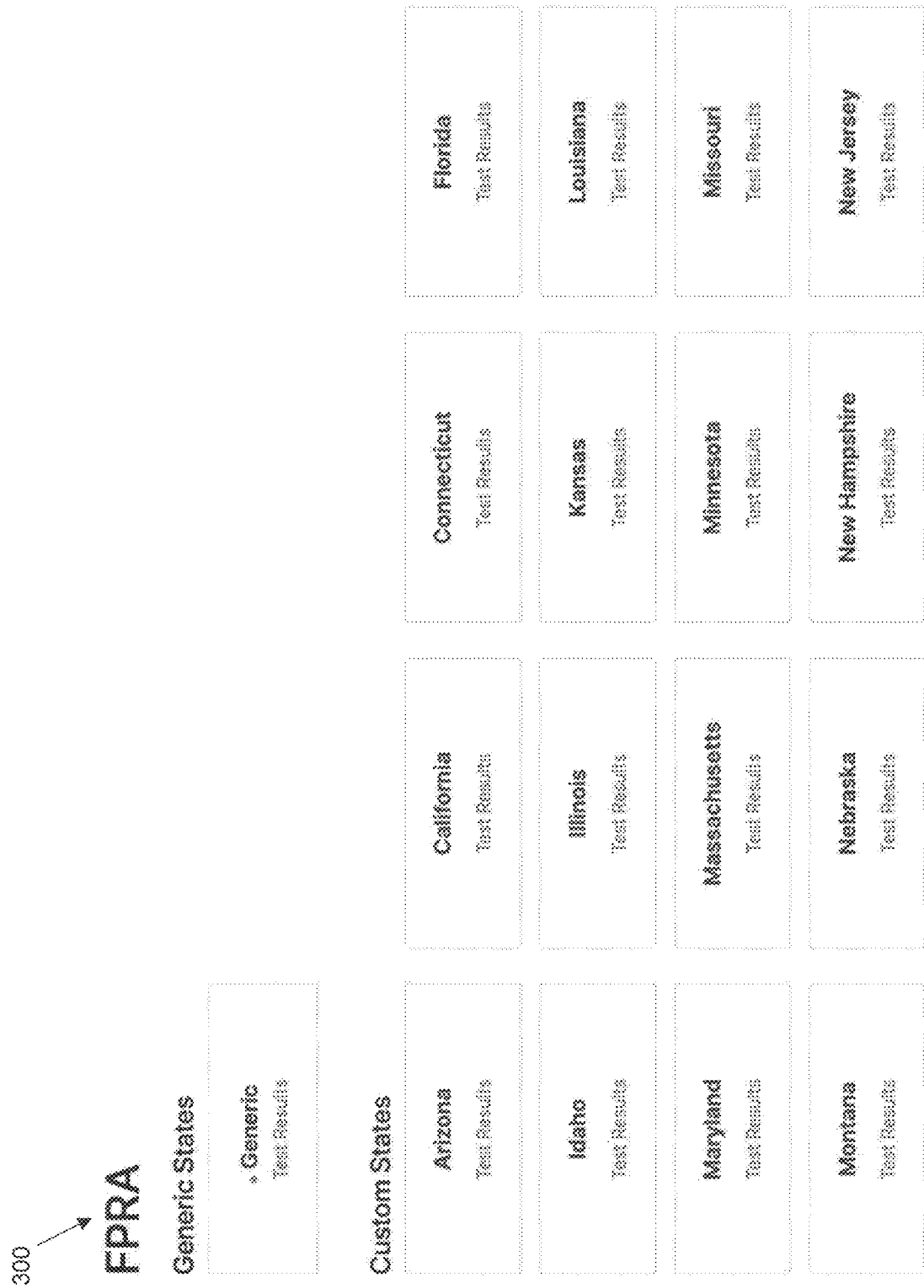
Figure 3B:
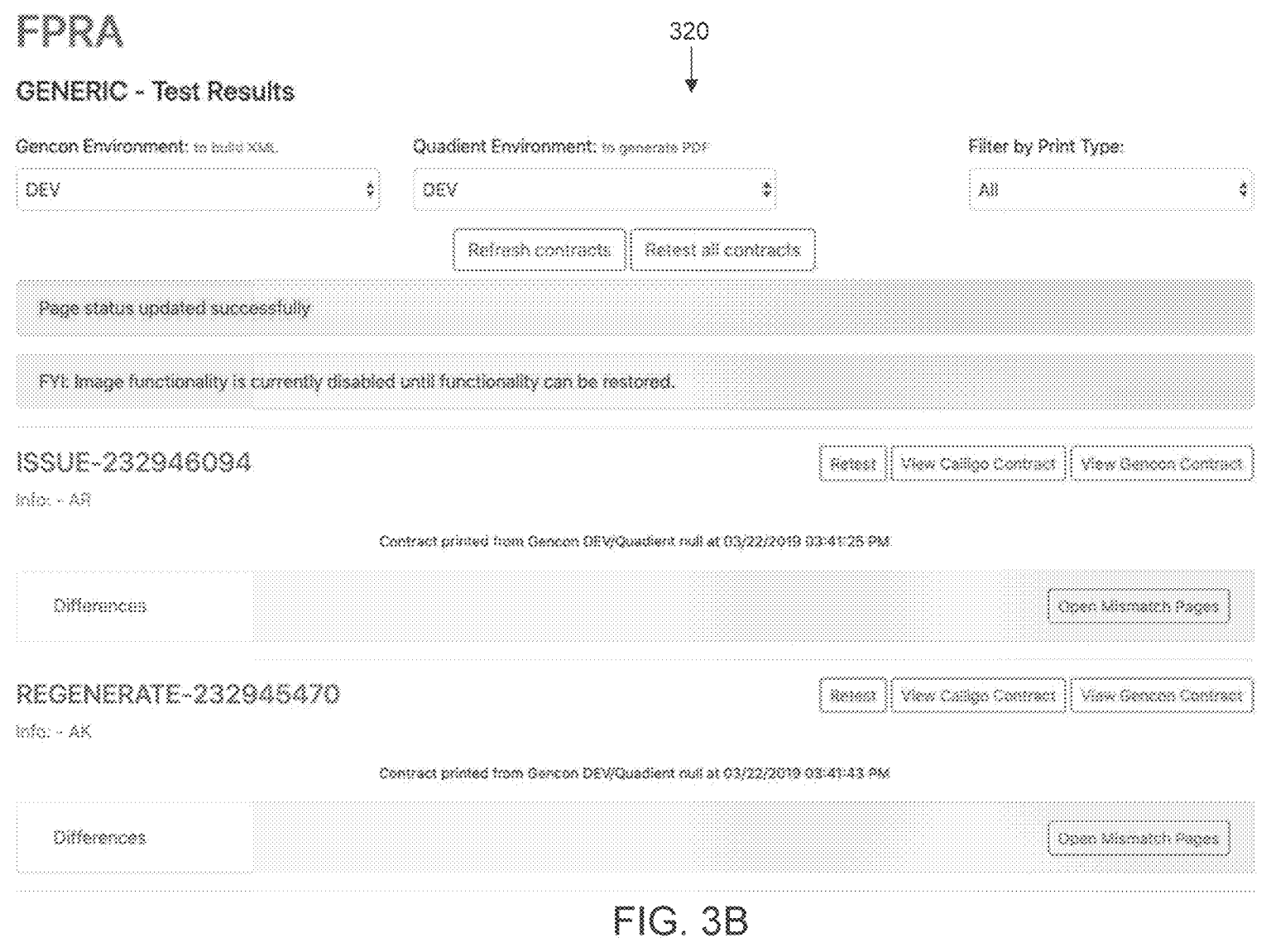
Figure 3C:
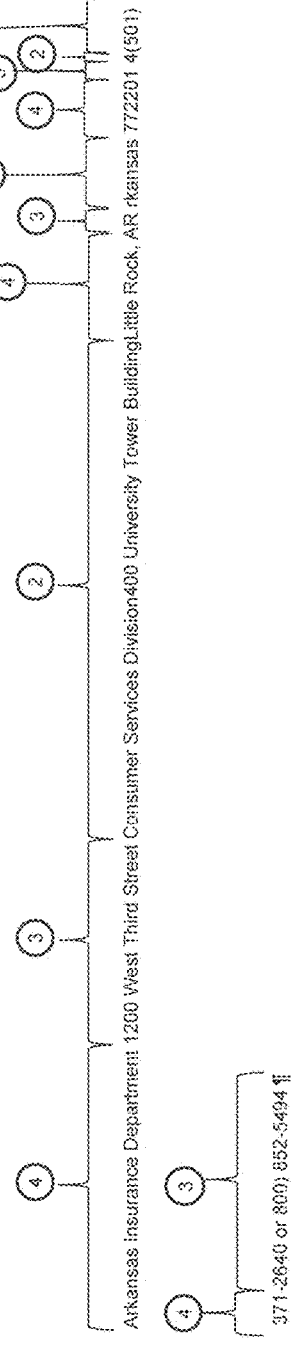
Figure 3D:
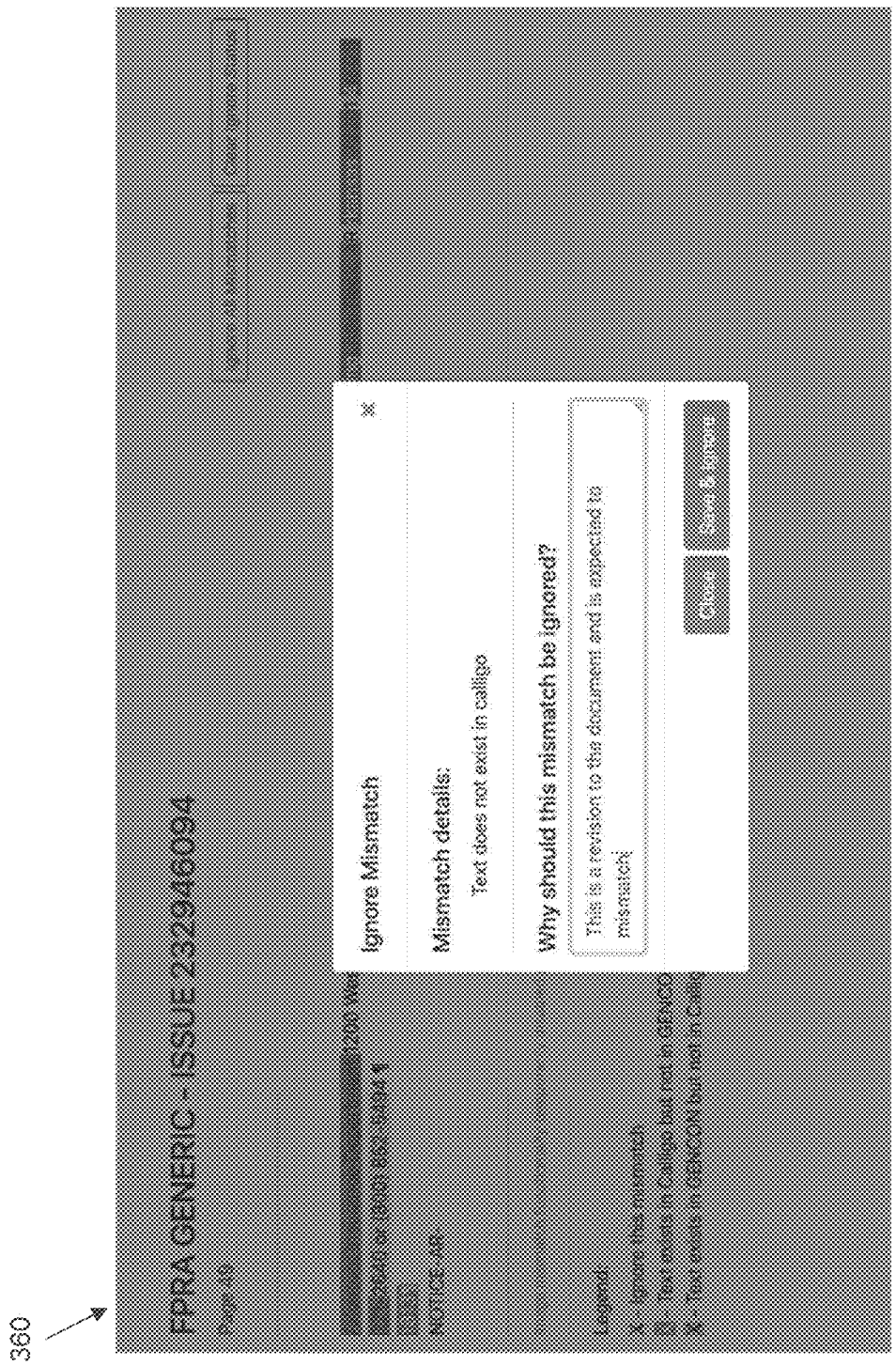

FIGS. 3A-3D are screenshots of webpages generated to compare documents, according to an illustrative embodiment of the invention. FIG. 3A shows one screen 300 generated by the hierarchy table, which includes a selection of "Generic States" and "Custom States" for test results for the Fidelity Personal Retirement Annuity (FPRA). FIG. 3B shows the main test page 320 for a document group showing test results for a FPRA comparison. In this case the hierarchy is the FPRA/Generic States document group, and each line delimited by the gray bars contains a document pair's comparison. FIG. 3C shows a single page comparison 340 for a document pair (in this case, page 49 of the 232946094 document pair in the FPRA/Generic States document group) (the legend can include a scheme of coloring and/or highlighting the text with different colors or color combinations, rather than using numerical indicators and brackets). FIG. 3D shows the mismatch marker screen 360. In this screen, when a user clicks on a mismatch, the user can mark that mismatch as acceptable and provide a reason for this decision, such that changes or other comparison mismatches that are deemed as "ok" can be tracked.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. The computer program can be deployed in a cloud computing environment (e.g., Amazon® AWS, Microsoft® Azure, IBM®). Method steps can be performed by one or more processors executing a computer program to perform functions of the invention by operating on input data and/or generating output data.

To provide for interaction with a user, the above described techniques can be implemented on a computing device in communication with a display device, e.g., a plasma or LCD (liquid crystal display) monitor or a mobile computing device display or screen for displaying information to the user and a keyboard and a pointing device, e.g., a mouse, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

It should also be understood that various aspects and embodiments of the technology can be combined in various ways. Based on the teachings of this specification, a person of ordinary skill in the art can readily determine how to combine these various embodiments. In addition, modifications may occur to those skilled in the art upon reading the specification.

What is claimed is:

1. A computerized method of comparing documents, the method comprising:
   receiving, by a computing device, a standalone source document file via a first automated document feed channel in electronic communication with the computing device;
   receiving, by the computing device, a standalone target document file via a second automated document feed channel in electronic communication with the computing device;
   pre-processing, by the computing device, the source document file using a document comparison engine operating on the computing device, thereby producing a pre-processed source document having a first text array including text from the source document file;
   pre-processing, by the computing device, the target document file using the document comparison engine, thereby producing a pre-processed target document having a second text array including text from the target document file;
   determining, by the computing device, using the document comparison engine operating on the computing device, a set of differences between the pre-processed source document and the pre-processed target document with respect to a set of pre-specified criteria, the set of differences based at least in part on differences between the first text array and the second text array; and
   generating, by the computing device, a summary of the set of differences between the pre-processed source document and the pre-processed target document,
   wherein the set of pre-specified criteria includes each of the following: textual content, image content, font name, font size, and font style; and wherein:
   (i) when the first and second text arrays each have at least one printable character of textual content, the computing device determines whether the printable characters in the first and second text arrays match;
   (ii) when the printable characters in the first and second text arrays match, the computing device determines whether the first and second text arrays have comparable font names, font sizes, and font styles; and
   (iii) when the source and target document files each include image content, the computing device determines whether a binary match exits between the image contents, either byte-for-byte or up to a configurable number of mismatching bytes.

2. The method of claim 1 further including providing, by the computing device, the summary of the set of differences to one or more user computing devices in electronic communication with the computing device.

3. The method of claim 2 wherein providing the summary of the set of differences includes coloring, by the computing device, the differences according to difference type, each difference type corresponding to a distinct color.

4. The method of claim 2 wherein providing the summary of the set of differences includes generating, by a graphical user interface operating on the computing device, a balloon graphic illustrating differences of different types distinctly.

5. The method of claim 1 further including storing, by the computing device, the set of differences between the pre-processed source document and the pre-processed target document in a server file system in electronic communication with the computing device.

6. The method of claim 1 wherein generating the summary of the set of differences includes (i) identifying each difference in the set of differences as significant or insignificant based on a threshold specified for each of the pre-specified criteria, and (ii) distinguishing the significant differences from the insignificant differences in the summary.

7. The method of claim 6 wherein the pre-specified criteria and the thresholds are configurable by a user.

8. The method of claim 1 further including assigning, to each of the source document file and the target document file, a tag indicating a document group or hierarchy based on one or more identifying criteria specified by a user.

9. The method of claim 1 further including prompting a user to mark one or more differences between the source document file and the target document file as permissible.

10. The method of claim 1 wherein each of the first channel and the second channel includes one of a representational state transfer (REST) service, a simple object access protocol (SOAP) service, a system file location, or a server file location.

11. The method of claim 1 further including counting separately, by the computing device, page numbers for each of the source document file and the target document file.

12. The method of claim 1 wherein at least one of the first channel or the second channel includes a static document channel for isolating a limited set of content exempt from operation of the document comparison engine.

13. The method of claim 1 wherein each difference in the set of differences is bounded by a minimum amount of matching content between the source document file and the target document file.

14. The method of claim 1 wherein pre-processing at least one of the source document file or the target document file includes performing, by the computing device, optical character recognition on at least a portion of an image included in the source document file or the target document file.

15. The method of claim 1 wherein the summary of the set of differences between the pre-processed source document and the pre-processed target document is included in an HTML file.

16. The method of claim 15 wherein the HTML file includes a hyperlink to re-test the target document file.

17. The method of claim 15 wherein the HTML file includes a hyperlink to at least one of the source document file or the target document file.

18. The method of claim 1 wherein generating the summary of the set of differences includes writing a file summarizing page results and another file summarizing image comparison results.

19. The method of claim 1 wherein pre-processing the source document file and pre-processing the target document file each include generating a separate array including non-textual characters.

20. A computing system for comparing a first document and a second document, the computing system comprising:
   a computing device having a processor and a memory;
   first storage in electronic communication with the computing device via a first automated document feed channel, the first storage for storing at least one standalone source document file; and
   second storage in electronic communication with the computing device via a second automated document feed channel, the second storage for storing at least one standalone target document file;
   wherein the computing device is configured to:
      receive the source document file via the first channel;
      receive the target document file via the second channel;

pre-process the source document file using a document comparison engine operating on the computing device, thereby producing a pre-processed source document having a first text array including text from the source document file;

pre-process the target document file using the document comparison engine, thereby producing a pre-processed target document having a second text array including text from the target document file;

determine, using the document comparison engine operating on the computing device, a set of differences between the pre-processed source document and the pre-processed target document with respect to a set of pre-specified criteria, the set of differences based at least in part on differences between the first text array and the second text array; and generate a summary of the set of differences between the pre-processed source document and the pre-processed target document, wherein the set of pre-specified criteria includes each of the following: textual content, image content, font name, font size, and font style; and wherein:

(i) when the first and second text arrays each have at least one printable character of textual content, the computing device determines whether the printable characters in the first and second text arrays match;

(ii) when the printable characters in the first and second text arrays match, the computing device determines whether the first and second text arrays have comparable font names, font sizes, and font styles; and (iii) when the source and target document files each include image content, the computing device determines whether a binary match exits between the image contents, either byte-for-byte or up to a configurable number of mismatching bytes.

21. The computing system of claim 20 wherein the first storage includes a first cloud server and the second storage includes a second cloud server.

22. The computing system of claim 20 further including a user computing device in electronic communication with the computing device for receiving at least one of comparison requests or displaying test results.

23. The computing system of claim 20 wherein the computing device includes a cloud server having a java application server and a server file system.

* * * * *